United States Patent [19]

Koniger et al.

[11] 3,954,276

[45] May 4, 1976

[54] IMPACT DEVICE

[75] Inventors: Rudolf Koniger, Buchholz-Batzenhausle; Jurgen Heuenburg, Emmendingen; Albert Frischmann, Freiburg; Kurt Mermi, Emmendingen, all of Germany

[73] Assignee: Upat-Max Langensiepen KG, Emmendingen, Germany

[22] Filed: June 27, 1974

[21] Appl. No.: 483,666

[30] Foreign Application Priority Data

Apr. 24, 1974 Germany ............ 2419631

[52] U.S. Cl. ............ 279/97; 279/1 B

[51] Int. Cl.[2] ............ B23B 31/08

[58] Field of Search ............ 279/19, 19.5, 86, 97, 279/1 B; 37/142 A; 85/5 N, 8.9; 299/92; 403/316, 324, 379

[56] References Cited

UNITED STATES PATENTS

| | | | |
|---|---|---|---|
| 688,860 | 12/1901 | Kay et al. | 279/97 |
| 1,182,934 | 5/1916 | Scott | 279/97 X |
| 1,423,595 | 7/1922 | Bayles | 279/97 |
| 2,147,163 | 2/1939 | Jimerson | 279/97 X |
| 2,224,063 | 12/1940 | Roberts | 279/19.5 |
| 3,357,294 | 12/1967 | Taylor | 403/316 X |
| 3,726,533 | 4/1973 | Lafferty | 279/97 |

*Primary Examiner*—Leonidas Vlachos
*Attorney, Agent, or Firm*—Michael J. Striker

[57] ABSTRACT

A hammer-drill or the like has a chuck formed with a first bore and with a second bore which intersects the first bore. A tool bit has a shank that is receivable in the first bore and is provided with a surface recess transverse to the elongation of the first bore. A locking stud is received and axially shiftable in the second bore between one position in which it extends through the recess and locks the tool bit in the first bore, and another position in which it is retracted out of the recess. An arresting arrangement is provided which normally arrests the locking stud in its tool-locking position, and which can be operated to release the stud so that the same can be moved out of this position.

19 Claims, 17 Drawing Figures

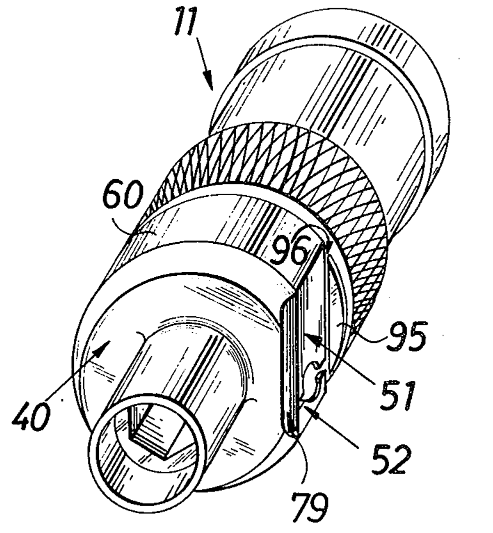
FIG. 9
FIG. 10
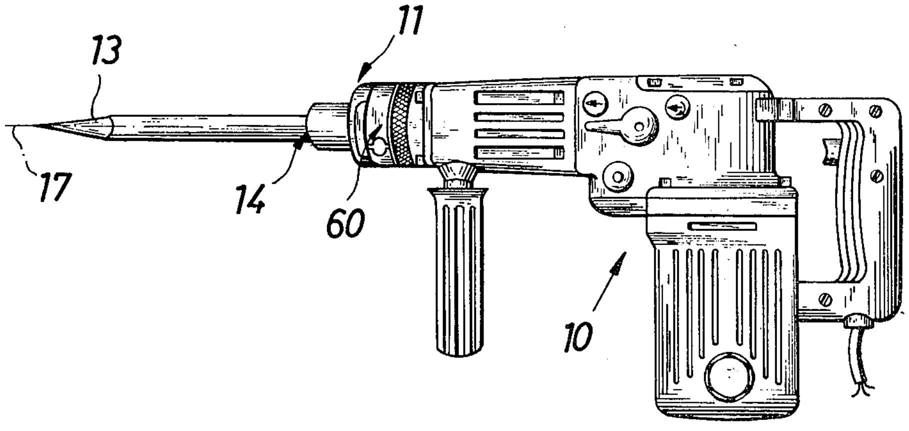

IMPACT DEVICE

BACKGROUND OF THE INVENTION

The present invention relates generally to an impact device, and more particularly to an impact device of the type having a chuck which can releasably accommodate a tool bit.

Impact devices of this general type are already known in the art. They may, for example, be constructed as hammer-drills, as power chisels or the like, and the chuck accomodates a tool in form of a chisel bit, a drill bit or the like. The principle of operation of these devices is that the tool bit is turned in rotation and also has axially acting impacts imparted to it. Some of these devices have tool bits that cannot be removed, but as a general rule these devices are provided with a chuck having an axial guide into which the tool bit can be inserted and from which it can be removed, so that either a different type of tool bit can be used with the device, or else a tool bit that is warn or damaged can be removed and replaced by another one. Usually, the axial guide for the tool bit is in form of a bore in the chuck, having a polygonal cross-section in which a shank of the tool bit is matingly received. Thus, the tool bit cannot turn with reference to the chuck, but it can turn with the chuck and can of course also have axial impacts imparted to it.

It is important in these devices to fix the tool bit so that it cannot come loose, that is that it cannot unintentionally come out of the chuck, or perform unintended axial movements relative to the chuck. For this purpose it is known to provide the tool bit with a recess or an opening, and to insert a pin into this recess, the pin being so configurated that when it is turned about its longitudinal axis through, e.g. 90° or 180°, it will permit the tool bit to be removed, or another tool bit to be inserted.

These known devices have certain disadvantages. One of these results from the fact that unavoidably these impact devices will at times perform idling movements, that is if for instance the tool bit has just penetrated a wall on one blow, during the next impact there will be nothing to resist the forward movement of the tool bit, and the impact device will "idle", that is it will exert impacts upon the tool bit which, however, are not resisted by a workpiece against which the tool bit is pressed. Tests that have been conducted with impact devices of the type in question have shown that under these and other circumstances the resting device, for instance the pin that is to hold the tool bit in the shank, are subjected to very high stresses. Of course, they are also subjected to such stresses when the impact device actually performs work, and it follows that these arresting devices are components of the impact devices which are constantly subject to the danger of breakage.

SUMMARY OF THE INVENTION

Accordingly, it is a general object of the invention to provide an improved impact device which avoids the aforementioned disadvantages.

More particularly, it is an object of the invention to provided such an improved impact device, for example a hammer-drill or the like, which is provided on its chuck with an arresting arrangement that avoids the disadvantages of the prior art.

Another object of the invention is to provide an impact device with such an arresting arrangement which provides for excellent retention of the tool bit, but which on the other hand can be moved to and retained in its release position with great ease.

Another object of the invention is to provide such an arresting arrangement in an impact device of the type in question, which arresting arrangement is simple to manufacture and to operate and which cannot pose any danger of injury to an operator of the tool.

Still another object of the invention is to provide such an impact device wherein the arresting arrangement makes it possible not only to be operated for either arresting or releasing the tool bit, with simple tools that are readily available everywhere, but can also be readily replaced if and when the need should arise.

In keeping with these objects, and with others which will become apparent hereafter, one feature of the invention resides in an impact device, particularly a hammer-drill or the like, having a combination of a chuck formed with a first bore adapted to accommodate a shank of a tool bit, and a second bore which intersects the first bore. A tool bit has a shank receivable in the first bore and is provided with a surface recess transverse to the elongation of the first bore. A locking stud is received and axially shiftable in the second bore between a tool-locking position in which it extends through the recess and a tool-releasing position in which it is retracted out of the recess. Arresting means is provided for normally arresting the locking stud in the tool-locking position, and is operable for releasing the stud for movement to and from the tool-releasing position thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 7:
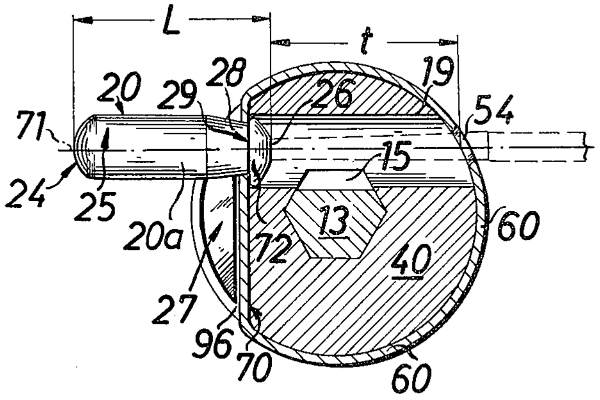
FIG. 7 is a view similar to FIG. 6, but illustrating the arresting means of FIG. 6 in a different position.
Figure 8:
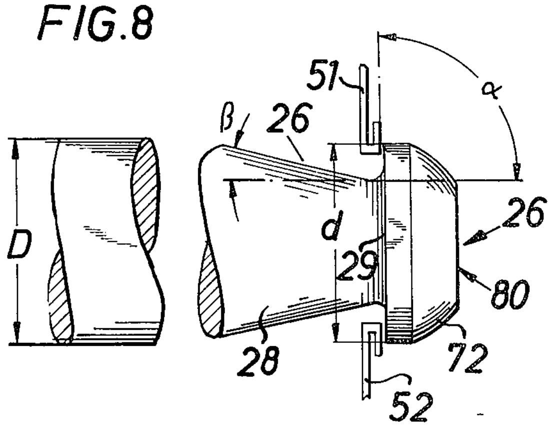

FIG. *7a* is a view similar to FIG. *6a*, but showing a detail of FIG. 7;

FIG. *7b* is a view similar to FIG. *6b*, but showing the detail C of FIG. *7a*;

FIG. 8 is a partly broken-away side view showing an end portion of a component of the arresting means according to the present invention, on an enlarged scale;

FIG. 9 is a perspective view showing the chuck; and

FIG. 10 is a diagrammatic side view of an impact device embodying the invention.

DESCRIPTION OF THE PREFERRED EMBODIMENTS

Referring to the drawings in detail, it will be seen that in FIG. 10 we have illustrated an impact device 10 which is shown somewhat diagrammatically and which may be a hammer drill, a power-chisel or the like. The device 10 is provided with a chuck 11 that is shown in more detail in the other Figures, for example FIGS. 1, 4 and 9. This chuck 11 is formed with an axially extending first bore 12 in which the shank 14 of a tool bit 13 — e.g. a chisel, a drill or the like — is receivable. It is advantageous if the cross-section of the bore 12 is polygonal, and if the outer contour of the shank 14 is matingly configurated, so that the tool bit 13 cannot turn in the bore 12.

The tool bit shank 14 is formed with a surface recess 15, and the arresting means according to the present invention includes a locking stud 20 which can be made to extend through this recess 15 so as to lock the tool bit 13 to the chuck 11. Details are clearly shown in FIGS. 1, 4, 6 and 7, among others, and will be subsequently described. The chuck 11 itself has a body 40 on which the stud 20 and the other components of the arresting means are mounted.

The body 40 is formed with a second or transverse bore 19 which extends all the way through the body 40 and which is located eccentrically with reference to the longitudinal axis 17 of the tool bit 13 and hence of the bore 12. The stud 20 is located with some play in the bore 19, being shiftable axially therein. The bore 19 has open ends 21 and 22, and the stud 20 is locked into the bore, that is prevented from falling out of the same, by the arresting means which blocks the opening 21 in such a manner that access may be had to the bore through this opening if and when desired, whereas it completely blocks the opening 22 against insertion or removal of the stud 20, but leaves open an aperture 54 through which the stud 20 may have motion imparted to it to shift it between its tool-arresting and tool-releasing positions.

Figure 1:
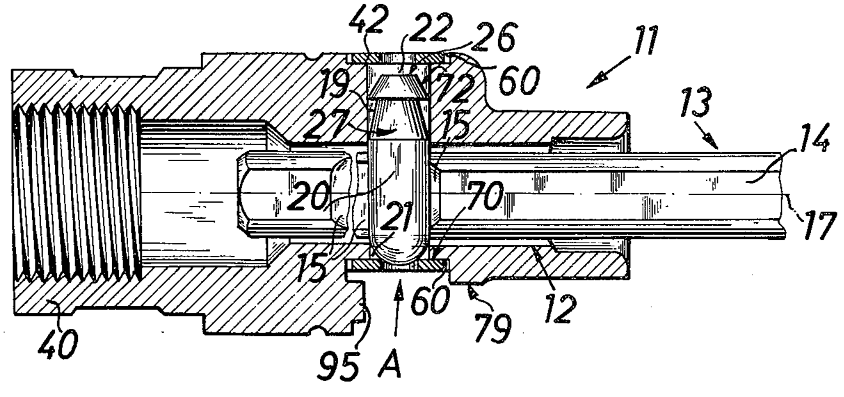
FIG. 1 is an axial section through a portion of an impact device provided with one embodiment of the invention.
Figure 2:
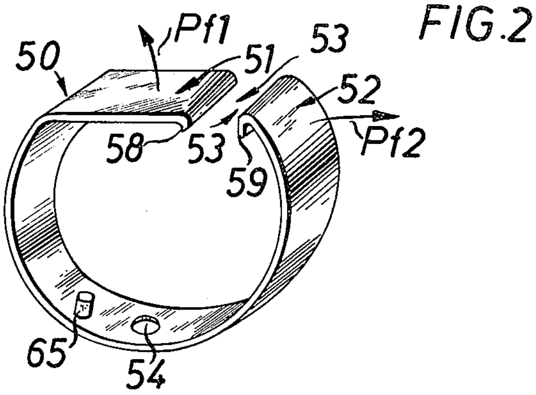
FIG. 2 is a perspective view, illustrating a component of the arresting means that can be employed in FIG. 1.

The arresting means that is illustrated in FIG. 1 includes the component shown in FIGS. *3a* and *3b*, although it could also utilize the component in FIG. 2. The latter Figure will be discussed later.

Figure 3B:
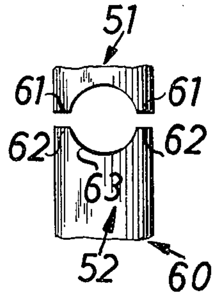
FIG. 3*b* is a fragmentary detail view of FIG. 3*a*, as seen in the direction of the arrow A thereof.
Figure 3A:
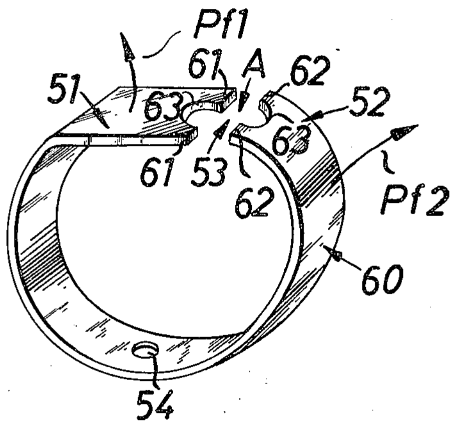
FIG. 3*a* shows a component analogous to that of FIG. 2, but which is the one that is actually used in FIG. 1.

The component in FIGS. 3a and 3b is configurated as an annular leaf spring 60, and the configuration of this component is the one that is currently preferred. The leaf spring 60 is circumferentially incomplete, in that it has free ends 51 and 52 which are spaced from one another by some distance to define a gap 53. One or both of these ends 51, 52 overlie at least in part one of the open ends of the transverse bore 19, in the embodiment of FIG. 1 the open end 21. For this purpose, the leaf spring 60 is received in a circumferentially extending recess which in this case is formed in the outer circumferential surface of the chuck 11 and is designated with reference numeral 42. The stud 20 has a reduced-diameter neck 27, as will be described more fully afterwards, and each of the ends 51, 52 of the leaf spring 60 has a free edge 61, 62 which are respectively formed with semi-circular cutouts 63. These cutouts may embrace the neck 27 behind a head 72 of the stud 20, when the latter is in the tool releasing position as shown in FIG. 7, in which it is retracted out of the surface recess 15 and actually extends outside the chuck 11. This arrangement prevents the stud 25 from falling out of the chuck, since it is being held as is clearly shown in FIG. 7. The provision of the cutouts 63, incidentally, assures that a larger surface area of the open end 21 can be covered (compare the broken lines in FIG. 5) than would be the case if these cutouts were not present.

Figure 6:
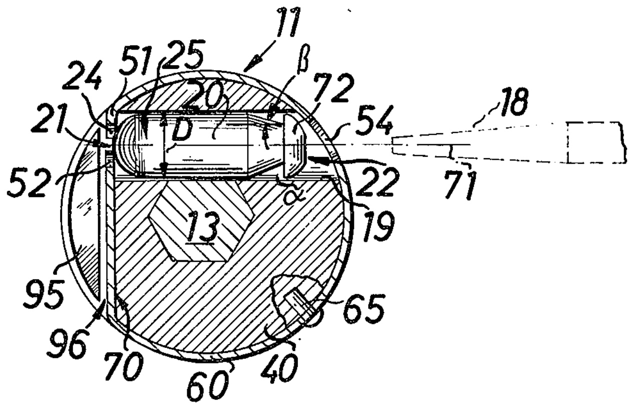
FIG. 6 is a section taken on line VI—VI of FIG. 5.

FIGS. 6 and 7 show the operation of the arrangement according to the present invention particularly clearly. The ends 51, 52 of the leaf spring 60 block the open end 21 of the bore 19, so that the stud 20 cannot move out through this open end. On the other hand, the leaf spring 60 is flexible enough so that its ends can be bent apart to expose the open end 21 of the bore 19. The other open end 22 is blocked due to the fact that the leaf spring 60 overlies it, and the stud 20 is therefore reliably retained in the transverse bore 19. It has a slight amount of axial play in this bore and is retained in its tool-locking position which is illustrated in FIG. 6, by the presence of the spring 60. Due to the presence of the aperture 54, which registers with the open end 22, any suitable tool, such as a screw driver or the like, can be inserted through the aperture 54 to exert axial pressure upon the stud 20 (towards the left in FIG. 6) to thereby push the rounded end 24 of the same against the ends 51, 52 of the leaf spring 60, causing the same to flex apart sufficiently so that the stud 20 can shift out through the open end 21. This movement can take place only to such an extent that the head 72 will abut the inside of the ends 51, 52 of the spring 60, which will thus reliably retain the stud 20 from completely falling out of the bore 19, due to the fact that the ends 51, 52 flex together when they come to the region of the reduced-diameter neck 27 and engage behind the head 72. If desired, a special tool 18, may be provided, as shown in broken lines in FIG. 6, which may be so configurated that it can be inserted through the aperture 54 to just an extent that is sufficient to permit shifting of the stud 20 from the position of FIG. 6 to the position of FIG. 7, but not further. This relationship can be obtained by appropriately accommodating the cross-section of the tool 18 to the diameter of the aperture 54, and this then makes it impossible to exert any further pressure upon the stud 20 in a sense tending to expel it passed the open end 21, once the head 72 has moved into engagement with the ends 51, 52 of the leaf spring 60.

The neck 27 is of reduced diameter, as compared to the center portion 20*a* of the stud 20 which is of a full diameter, that is whose diameter is not at all reduced anywhere. The neck 27 is here configurated as a cone 28 and merges with the head 72 via a shoulder 29. The head 72 may have a part-spherical, part-conical or similar configuration which is so chosen that when the stud 20 is inserted into the bore 19 during assembly of the device, or subsequently when the stud is inserted as a replacement for another one that has been removed, the configuration of the head 72 aids in spreading the ends 51 and 52 of the leaf spring 60 apart. The outer diameter *d* in the region of the head 72 is somewhat smaller than the diameter D of the center portion 20*a* (compare FIGS. 4*b*, 6 and 8), which is an important consideration. It not only contributes to a saving in material, but because of this lesser diameter the stud 20 cannot engage the wall bounding the bore 19 with the head 72. This means that no forces are transmitted between the tool bit 13 and the chuck 11 via the end portion 26 of the stud 20, so that all forces are transmitted only via the center portion 20*a;* the result, as tests have shown, is that the stud 20 is much more resistant to breakage due to such forces than would be the case if the forces were also transmitted via the end portion 26.

Figure 4:
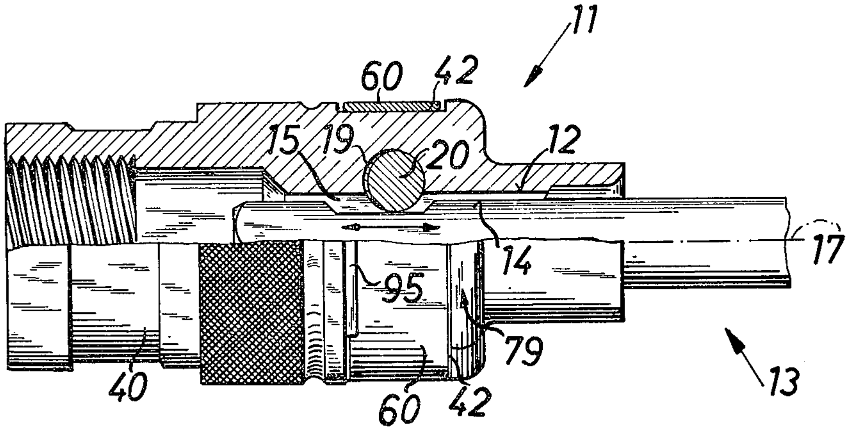
FIG. 4 is a view similar to FIG. 1, partly in section but turned through 90° with reference to the illustration in FIG. 1, about a turning axis located in the plane of the drawing.
Figure 4A:
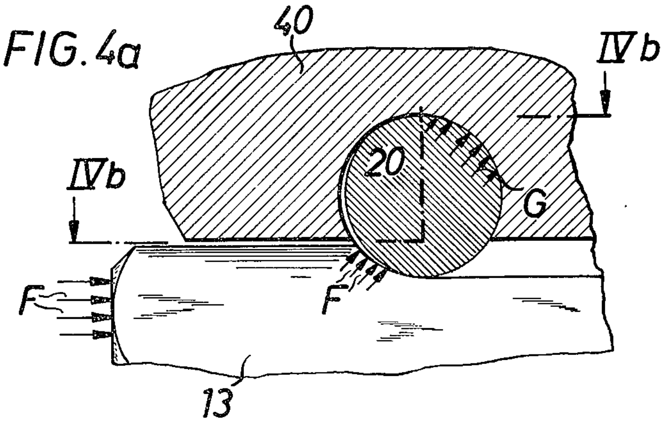
FIG. 4*a* is a fragmentary enlarged-scale detail view, indicating the forces which act upon the arresting means according to the present invention.
Figure 4B:
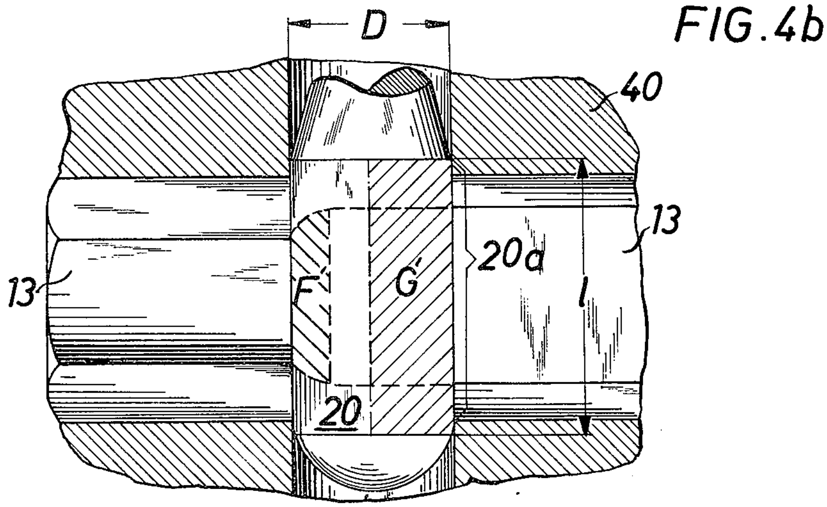
FIG. 4*b* is a partly sectioned enlarged-scale detail view, which also indicate forces acting upon the arresting means according to the present invention.

In this connection, FIGS. 4, 4*a* and 4*b* should be considered. These Figures indicate the forces which act upon the stud 20, particularly when the device performs idling movements. Reference character F identifies in FIG. 4*a* the forces which are transmitted from the impact device 10, which initially are transferred to the tool bit 13 and from the same to the stud 20. Reference character G identifies in FIG. 4*a* the forces which are transmitted from the stud 20 to the tool bit 13. The surface portions via which the forces F and G are transmitted are indicated with reference characters F′ and G′ in FIG. 4*b* for comparison with FIG. 4. Reference character *l* designates the length of the center portion 20*a* which as the diameter D and via which the forces are transmitted, whereas reference character L in FIG. 7 identifies the overall axial length of the stud 20.

It is clear from a consideration of the various drawings already discussed that the spring 60 assures that the center portion 20*a* of the stud 20 will be located centrally with reference to the longitudinal axis 17 of the bore 12 and the tool bit 13, or will be located at least substantially in this position, when the stud 20 is in the tool-locking position of FIG. 6, so that the advantageous force-transmitting conditions illustrated in FIGS. 4*a* and 4*b* are obtained.

The construction according to the present invention in effect provides a "cage" for the stud 20, in that the bore 19 together with the leaf spring 20 constitutes such a cage in which the stud 20, which has a slightly smaller diameter than the inner diameter of the bore 19, can readily turn in increments about its longitudinal axis as a result of the forces acting upon it, but can shift in its axial direction only to a very slight extent. Since the center portion 20*a* via which the stresses are exclusively transmitted, has the full diameter D and is nowhere weakened by a diameter reduction, and since no other part of the stud 20 contacts the walls bounding the bore 19, the advantageous conditions which have been diagrammatically shown in FIGS. 4*a* and 4*b* are obtained and, moreover, they are guaranteed to remain in existence due to the fact that the stud 20 is prevented by the spring 60 from axial shifting to an extent sufficient to interfer with these conditions. On the other hand, the stud 20 can be readily shifted between its tool-locking and its tool-unlocking positions, by the use of any simple screwdriver or other tool from the exterior of the chuck, and in operation no components that might interfer with the operation or cause a hazzard for the safety of the operator, extend beyond the chuck 11. A further advantage is the fact that all of the components are accommodated within the chuck, except for the spring 60 which is recessed into the same, so that no additional space is required, it being evident that the chuck 11 need not be made any larger with the present invention embodied in it, than it would be without the invention.

FIG. 4 indicates that when the stud 20 is in the tool-locking position (shown in FIG. 6), it permits a limited axial displacement of the tool bit 13 in the bore 12, to the extent of the elongation of the surface recess 15 in the direction of the axial extension of the tool bit 13. Except for this, however, any axial displacement of the tool bit 13 is prevented, and the tool bit cannot accidentally or undesirably move out of the bore 12.

The groove 42 is so dimensioned that it just accommodates the leaf spring 60, and in particular care is taken that no part of the leaf spring extends outwardly beyond the outer circumferential surface of the chuck 11, this being accomplished by making the groove 42 of requisite depth.

In the region of the open end 21 the groove 42 may be provided with an approximately flat facet 70 which, with reference to the cross-section of the chuck 11, has a chordal configuration, and on which the flat ends 51, 52 (compare FIGS. 3*a* and 3*b*) of the leaf spring 60 may rest. Of course, only one of these ends may rest on this facet 70. The facet 70 and/or the ends 51, 52 extend at least approximately normal to the longitudinal axis of the stud 20 when the spring 60 is in undeformed condition. This is clearly shown in FIGS. 6 and 7 and, when the stud 20 is of circular cross-section as shown, the free edges 61, 62 of the spring 60 engage the stud 20 simultaneously and uniformly. This is particularly true with respect to the approximately semi-spherical surface 25 at the end portion 24 of the stud 20. It is also true with respect to the configuration of the head 72 which is the leading part of the stud 20 when the latter is inserted into the bore 19 with the spring 60 already in place. The simultaneous engagement of both edges 61, 62 of the spring 60 with the head 72 during insertion of the latter, assures that the stud 20 does not move to a skew position, that is its longitudinal axis 71 does not tend to become inclined to the longitudinal axis of the bore 19, which would make the insertion much more difficult. Moreover, the forces required for axial shifting of the stud 20 are reduced by this measure, and the forces which are opposed by the ends 51, 52 of the spring 60 against complete ejection of the stud 20 out of the bore 19, are sufficiently large to prevent this.

Figure 5:
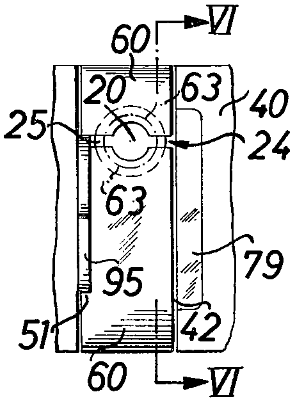
FIG. 5 is a fragmentary side view analogous to that in FIG. 4.
Figure 6A:
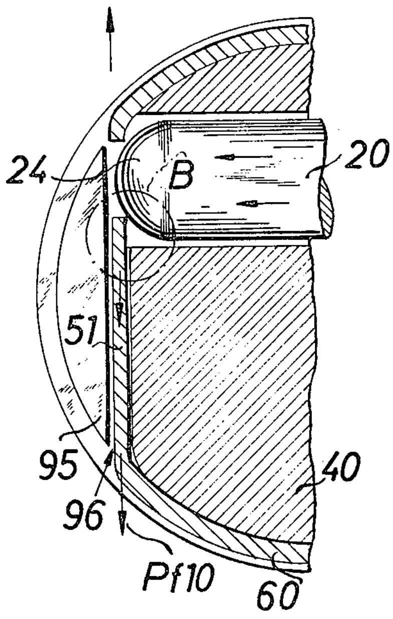
FIG. 6*a* is a fragmentary enlarged-scale detail view analogous to FIG. 6.
Figure 6B:
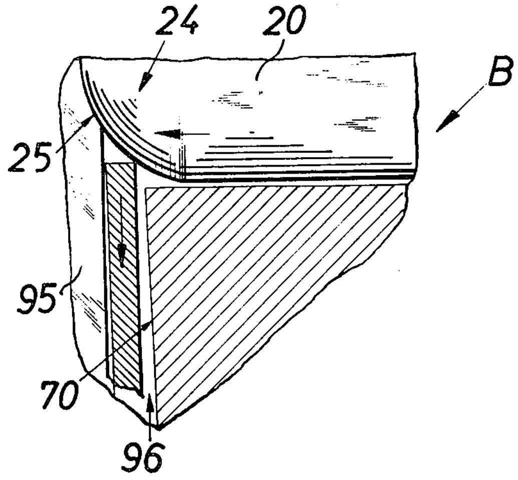
FIG. 6*b* is an enlarged-scale detail view showing the detail D of FIG. 6*a*.

To obtain a particularly reliable positioning of the ends 51, 52 of the spring 60, it is advantageous to provided an arrangement for assuring this. For this purpose a projection or nose 95 may be provided which extends in part over the facet 70 in the region of the groove 42, and forms a slot 96, which is of greater width than the thickness of the spring 60. FIGS. 4, 5 and 6 indicate this very clearly, and FIGS. 6, 6a and 6b show that a portion of the leaf spring 60, that is the portion 51 in this case, can have its margin received in this slot 96. It is also indicated that the slot 96 makes it possible to shift the end 51 in the direction of the arrow Pf10, but not to spread the spring apart when the stud 20 is moved out of its tool-locking position with its end 24. This is shown in FIG. 6*a* and again in FIG. 6*b* which illustrates it on a larger scale. In effect, the end 51 is guided approximately parallel with the facet 70.

Figure 7A:
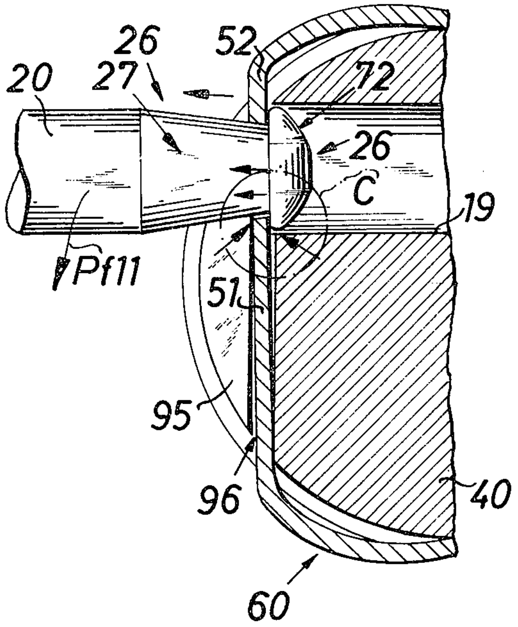
Figure 7B:
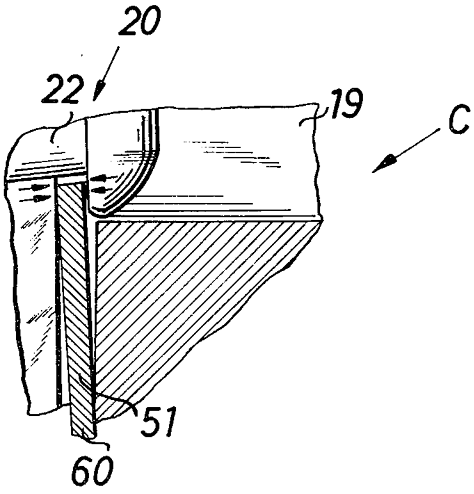

This arrangement, incidentally, also assures — as shown in FIGS. 7, 7*a* and 7*b*, that the end portion 26 of the stud 20 cannot unintentionally move out of the chuck. The abutment face 29 on this end portion 26 does not exert any forces upon the end 51 in the direction of elongation of the slot 69, so that the end 51 blocks the outlet end of the bore 19 as shown in FIGS. *7a* and *7b*, unless special measures are taken which, it should be noted, are also illustrated in FIG. 7a. For this purpose, that is to permit the removal of the stud 20 from the bore 19 if and when this is necessary, e.g. when the stud is damaged and is to be replaced with another one, the stud is first moved to its tool-releasing position and is then tilted in the direction of the end 51 of the spring 60, as indicated by the arrow Pf11 in FIG. *7a*. In this case the other end 52 of the spring, which is not held by a projection 95, is sufficiently deflected so that the inner end portion 26 of the stud 20 is released.

According to a further concept of the invention the edge portion 79 of the recess 40 is accommodated to the height and position of the facet 70 in the region of the same. This is shown in FIG. 9, and can also be seen in FIGS. 1, 4 and 5. By so doing, the portion 79 serves to secure the position of the end 51, and preferably the position of both of the ends 51 and 52 of the spring 60 against lateral deflection, because the ends 51, 52 will be guided by the surface 72 which is high enough to perform this function. On the other hand, the surface 72 is so close to the flat facet 70 that the ends 51 and 52 of the spring 60 can extend over the portion 79 and be inserted into the slot 69, aided by the elasticity of the spring 60. It has been found that in such a construction a reliable positioning of the spring 60 is possible without having to provide any other measures.

In order to obtain an increase of the retaining force of the spring 60 upon the stud 20, the spring 60 may be reinforced at the region of its ends 51, 52. FIG. 8 shows one possibility of doing this, in that the ends 51, 52 are bent back upon themselves and thus are of double thickness. Of course, such reinforcement can be obtained in other ways, for instance by providing a slight angling or profiling of the ends 51, 52, for example as suggested in FIG. 2 with respect to the spring 50 will be discussed later. The nose 95 which holds down the longer end 51 of the spring 60 does, in fact, in itself constitute in effect a reinforcement of the force which is exerted by the spring 60 upon the stud 20.

FIG. 8 also shows that the stud 20 is formed at one end with a flattened end face 80. Tests have indicated that such an end face is most advantageous for engagement with the auxiliary tool 18, or any other tool that is used to shift the stud 20 axially of the latter. It is also evident in FIG. 8 that the cone 28 has a small angle B, which facilitates the displacement of the stud 20 from the position of FIG. 7 to the tool-locking position of FIG. 6. The following angle $\alpha$ on the other hand is a 90° angle. It would also be possible to use a frustocone having a large angle $\alpha$, if desired. What is important is that the contact with the ends 51, 52 in this region provides an abutment in which the holding forces exerted by the spring upon the stud 20 are so large that the stud 20 cannot be pushed out of the bore 19 and become lost. On the other hand, it should still be possible to remove the stud 20 when it is intended to do so, so that it can be replaced by a new one. FIG. 8 shows that the angle $\alpha$ amounts to 90°, so that an abutment face 29 is obtained which extends normal to the shifting direction of the stud 20.

The spring 50 shown in FIG. 2 can be used with the embodiment illustrated in FIG. 1 and the other Figures, in lieu of the spring 60 which has heretofore been discussed.

The spring 50 of FIG. 2 corresponds largely to the spring 60 and like reference numerals identify like elements as before. It is employed in essentially the same manner as the spring 60, but the edges 58, 59 of its ends 51, 52 are slightly angled in inward direction and not provided with the cutouts 63, which is of course different from the spring 60. If the spring 50 is used, the abutment surface 29 of the stud 20 will be engaged by the inwardly angled free edges 58, 59 of the spring. There must of course be sufficient space provided in the region of the transverse bore 19 to accommodate the angled edges 58, 59.

In addition, the spring 50 in FIG. 2 has a projection 65 which engages in a corresponding recess of the body 40, as shown in FIG. 6, and thus prevents undesired turning or other displacement of the spring 50 with reference to the chuck 11, or even disengagement from the same. This is not necessary in the embodiment previously discussed, where the nose 95 is provided.

The impact device according to the present invention has many fold advantages of the prior art. In particular, the center portion 20a of the stud 20 has a cross-section or diameter D which is not weakened at all by any reductions, and the stud 20 is completely free to turn about its longitudinal axis. Tests have shown that in operations such an incremental turning of the stud 20 about its longitudinal axis does, in fact, take place which is desirable because constantly different portions of the stud 20 are exposed for the stress transmission. The portion 27 of the stud, on the other hand, cannot engage the walls bounding the bore 19 and thus does not participate in the stress transmission, and disadvantageous conditions that might arise from such a fact are therefore avoided.

The body 40 has in operation no parts at all which could project outwardly and therefore constitute a danger to an operator. The stud 20 projects outwardly only when the device is not in use, that is when the stud 20 has been moved to a position in which a tool bit 13 is to be inserted or removed. When the tool bit is to be in actual operation, the stud is completely received within the choke 11.

Moreover, no separate tools or devices are required for displacing the stud 20 axially of itself between its two positions, so that a nail, a screwdriver or the like can be used for this purpose unless it is specifically desired to use the special tool 18 which, however, is also of an extremely simple nature. If damage should occur to the stud 20 at a working location, the placement of the stud 20 can be carried out simply without requiring special tools for this purpose. Moreover, the possibility of danger to an operator is further reduced due to the fact that in operation the stud 20 is completely enclosed within the aforementioned cage and is not accessible, whereas when the stud is to be shifted to and from its tool-releasing position such shifting need not be carried out manually but is only carried out by means of a screwdriver, nail or the like. This latter factor is advantageous because experiments have shown that the stud 20 can become heated due to the energy that is transmitted through it, to temperatures on the order of 100° C, and thus could pose a substantial danger of burning if it were to be contacted directly by the fingers of a user.

It will be understood that each of the elements described above, or two or more together, may also find a useful application in other types of constructions differing from the types described above.

While the invention has been illustrated and described as embodied in an impact device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

We claim:

1. In an impact device, particularly a hammer-drill or the like, a combination comprising a chuck having a first bore adapted to accommodate a shank of a tool bit, and a second bore which intersects said first bore and has terminal portions that extend through a circumferential wall of said chuck at diametrally opposite locations and which each have an open end, said chuck further having an outer circumferential surface and an inner circumferential surface each of which encircles said first bore and one of which is formed with a circumferentially extending groove formed internally with a flat facet and traversed by said second bore; a tool bit having a shank receivable in said first bore and which is provided with a surface recess transverse to the elongation of said first bore; a locking stud received and axially shiftable in said second bore between a tool-locking position in which it extends through said recess and a tool-releasing position in which it is retracted out of said recess, said stud having a center portion of maximum diameter which extends across said first bore and in part into the respective terminal portions when said stud is in said tool-arresting position so that forces are transmitted between said chuck and said tool bit via said center portion; and arresting means for normally arresting said stud in said tool-locking position and operable for releasing said stud for movement to and from said tool-releasing position, said arresting means comprising a spring element in form of a circumferentially incomplete annular leaf spring received in said groove and having two end portions defining with one another a gap and at least one of which is provided with a flat surface resting on said facet, said leaf spring extending circumferentially of said chuck blocking both of said open ends and being displaceable to unblock the other of said open ends for insertion and extraction of said stud, at least one of said end portions of said leaf spring at least in part overlying said other open end, said leaf spring being provided with an aperture smaller than but registering with said one open end.

2. A combination as defined in claim 1, wherein said facet is at least in part bounded by a recess formed in an adjacent side wall of said groove; and wherein said one end portion has a lateral margin is received in said recess.

3. A combination as defined in claim 1, wherein said facet is at least in part bounded by a recess formed in an adjacent side wall of said groove; and wherein said one end portion has a lateral margin which is received with play in said recess.

4. In an impact device, particularly a hammer-drill or the like, a combination comprising a chuck having a first bore adapted to accommodate a shank of a tool bit, and a second bore which intersects said first bore and has terminal portions that extend through a circumferential wall of said chuck at diametrally opposite locations and which each have an open end; a tool bit having a shank receivable in said first bore and which is provided with a surface recess transverse to the elongation of said first bore; a locking stud received and axially shiftable in said second bore between a tool-locking position in which it extends through said recess and a tool-releasing position in which it is retracted out of said recess, said stud having a center portion of maximum diameter which extends across said first bore and in part into the respective terminal portions when said stud is in said tool-arresting position so that forces are transmitted between said chuck and said tool bit via said center portion, said stud further having an end portion facing one of said open ends and formed with a reduced-diameter neck; and arresting means for normally arresting said stud in said tool-locking position and operable for releasing said stud for movement to and from said tool-releasing position, said arresting means comprising a spring element in form of a circumferentially incomplete annular leaf spring having two end portions defining with one another a gap, said leaf spring extending circumferentially of said chuck blocking both of said open ends and being displaceable to unblock the other of said open ends for insertion and extraction of said stud, at least one of said end portions of said leaf spring at least in part overlying said other open end, said leaf spring being provided with an aperture smaller than but registering with said one open end and with respective recesses in said end portions which recede from said gap and are adapted to at least in part surround said neck of said stud to thereby support said stud in said tool-releasing position.

5. A combination as defined in claim 4, wherein said second bore is eccentric with reference to a longitudinal axis of said first bore.

6. A combination as defined in claim 4, wherein said stud is of circular cross-section and received with play in said second bore, so as to have freedom of turning movement about its own longitudinal axis.

7. A combination as defined in claim 4, wherein said stud has another end portion of substantially hemispherical configuration.

8. A combination as defined in claim 4, wherein one of said end portions is provided with means for facilitating the axial shifting of said stud in said second bore.

9. A combination as defined in claim 8, wherein said means for facilitating comprises a surface extending substantially normal to the elongation of said stud.

10. A combination as defined in claim 4, and further comprising an actuating element configurated so as to be insertable through the other open end into said second bore to a maximum extent which corresponds substantially to the distance traversed by said stud when the latter is shifted between said positions thereof.

11. A combination as defined in claim 4, wherein said chuck has an outer circumferential surface and an inner circumferential surface each of which encircles said first bore; and further comprising a circumferentially extending groove formed in one of said surfaces, said spring element being received in said groove and said second bore traversing said groove.

12. A combination as defined in claim 4, wherein said spring element is reinforced in the region of said end portions thereof.

13. A combination as defined in claim 12, wherein each of said end portions is bent back upon itself.

14. A combination as defined in claim 4; and further comprising detent means for preventing turning of said spring element in direction circumferentially of and with reference to said chuck.

15. A combination as defined in claim 14, wherein said detent means comprises a detent portion on said chuck.

16. A combination as defined in claim 14, wherein said detent means comprises a detent portion on said spring element.

17. A combination as defined in claim 4, wherein each of said end portions of said spring element has a free edge, and wherein said recesses are semi-circular cut-outs extending inwardly of the respective free edge.

18. A combination as defined in claim 17, wherein the diameter of the combined areas of said semi-circular cut-outs is at most equal to said diameter of said neck.

19. A combination as defined in claim 4, wherein said stud has at least one end portion which diverges in direction toward an opposite end portion so as to facilitate the insertion of said stud into said second bore.

* * * * *